United States Patent [19]

Du Bose

[11] 3,848,560
[45] Nov. 19, 1974

[54] AMPHIBIOUS MOTORCYCLE

[76] Inventor: Samuel R. Du Bose, P.O. Box 1134, Clarksdale, Miss. 38614

[22] Filed: Aug. 20, 1973

[21] Appl. No.: 390,058

[52] U.S. Cl. ................................................ 115/1 R
[51] Int. Cl. .............................................. B60f 3/00
[58] Field of Search ............ 115/1 R, 2, 25, 26, 27, 115/19, 70, 1 A; 114/310 R

[56] References Cited
UNITED STATES PATENTS

| | | | |
|---|---|---|---|
| 1,337,372 | 4/1920 | Sopcense | 115/26 |
| 3,397,669 | 8/1968 | Katehis | 115/2 |
| 3,483,844 | 12/1969 | Trautwein | 115/70 |

FOREIGN PATENTS OR APPLICATIONS

| | | | |
|---|---|---|---|
| 25,109 | 12/1905 | Great Britain | 115/1 |

Primary Examiner—Trygve M. Blix
Assistant Examiner—Charles E. Frankfort
Attorney, Agent, or Firm—John R. Walker, III

[57] ABSTRACT

An amphibious motorcycle which has the usual conventional structure for operation on land and includes a pair of forward skis which are disposed on either side of the front wheel and are fixedly attached to the front fork with suitable brackets so that when the front wheel is turned, i.e., left or right, the skis turn therewith. Also, included are a pair of rearward skis which are disposed on either side of the rear wheel and are fixedly attached to the frame with suitable brackets. The forward and rearward skis keep the motorcycle waterborne so long as the motorcycle is suitably propelled. The machine is propelled in the water by paddles which are disposed between the spokes of the rear wheel and are fixedly attached thereto. The machine is operated on the water by first being accelerated on a hard surface, e.g., a floating runway or the shore, and then is driven into the water whereupon the skis keep the machine waterborne as the paddles sustain the propulsion.

8 Claims, 4 Drawing Figures

PATENTED NOV 19 1974　　　　　　　　　　　　3,848,560

3,848,560

AMPHIBIOUS MOTORCYCLE

BACKGROUND OF THE INVENTION

1. Field of the Invention

This invention relates to the field of amphibious motorcycles and more particularly amphibious motorcycles which do not depend upon floatation equipment.

2. Description of the Prior Art

A preliminary patentability search revealed the following U.S. Pat. Nos.: The VanCaneghem Pat. No. 2,075,785; the Montalbano Pat. No. 2,369,973; the Truter Pat. No. 2,757,631; the Allen et al. Pat. No. 3,155,185; the Jenkins Pat. No. 3,215,114; the Rossi Pat. No. 2,979,016; and the D'Arena Pat. No. 3,359,937. A few of the above patents pertain to amphibious motorcycles which depend upon floatation equipment. However, none of the above patents show or suggest applicant's device. The prior amphibious motorcycles known by the applicant all include floatation equipment for keeping the motorcycle afloat when in the water. The floatation equipment must by necessity be relatively large, bulky and heavy which obviously adversely affects speed and maneuverability while operating the machine on the water or on the land.

SUMMARY OF THE INVENTION

The present invention is directed towards overcoming the disadvantages and problems relative to previous amphibious motorcycles. The concept of the present invention is to provide an amphibious motorcycle which may be driven at relatively high speeds on the surface of a body of water and is very maneuverable both on the land and on the water. The amphibious motorcycle of the present invention is directed towards providing more gusto in the sport of operating a motorcycle. More specifically, the amphibious motorcycle of the present invention may be used for racing events which encompass both a land course and a water course. The water course may also include an inclined ramp which the motorcycle negotiates with the wheels, i.e., the inclined ramp might be floated in the body of water requiring the machine to approach the ramp while depending upon the skis, then negotiate the ramp utilizing the wheels, then leap from the top of the ramp and land back on the body of water whereupon the skis again enable the machine to be waterborne.

The amphibious motorcycle of the present invention has the usual conventional structure for operation on land and includes a pair of forward skis which are disposed on either side of the front wheel and are fixedly attached to the front fork with suitable brackets so that when the front wheel is turned, i.e., left or right, the skis turn therewith. Also included are a pair of rearward skis which are disposed on either side of the rear wheel and are fixedly attached to the frame with suitable brackets. The forward and rearward skis preferably include downwardly directed skegs which provide optimum control and stability for maneuvering the machine.

The forward and rearward skis keep the motorcycle waterborne so long as the motorcycle is suitably propelled. The machine preferably is propelled in the water by paddles which are disposed between the spokes of the rear wheel and are fixedly attached thereto. The machine is intended to be operated on the water by first being accelerated on a hard surface, e.g., a floating runway or the shore, and then is driven into the water whereupon the skis keep the machine waterborne as the paddles sustain the propulsion.

DESCRIPTION OF THE PREFERRED EMBODIMENT

Figure 1:
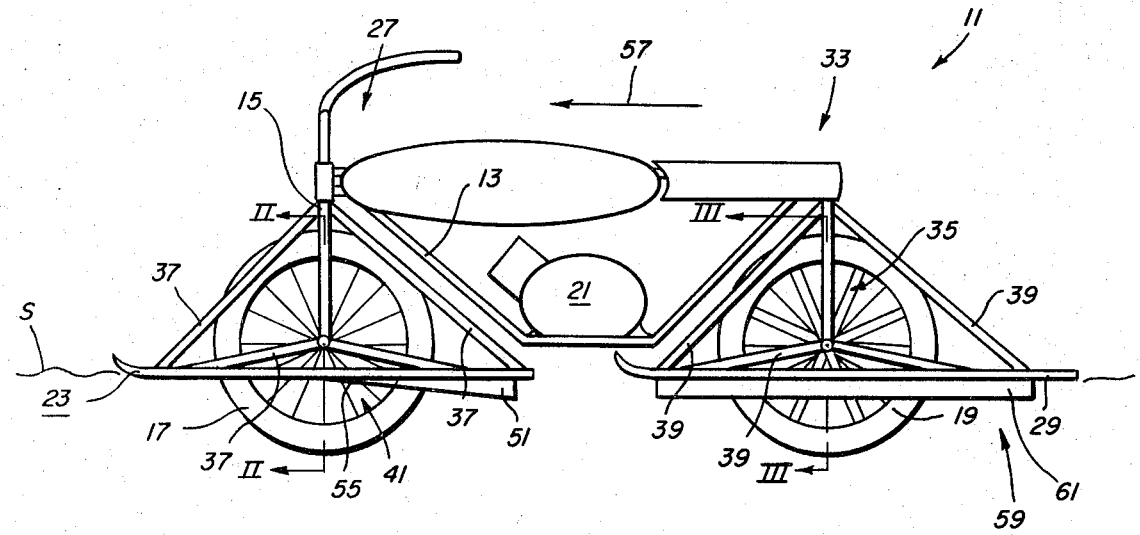
FIG. 1 is a side elevational view depicting a typical motorcycle and showing the structure of the present invention suitably attached thereto.

The amphibious motorcycle 11 of the present invention is basically a conventional motorcycle having a frame 13, a guidable fork 15 pivotally attached to the frame 13 for pivotal movement about a substantially vertical axis, a forward wheel 17 rotatably attached to the fork 15, a rearward wheel 19 journalled to the frame 13 in the usual manner, and drive means 21 attached to the frame for rotatably driving the rearward wheel 19. In other words, the motorcycle or vehicle 11 includes conventional structure usually associated with a motorcycle for travel over a hard surface, e.g., a roadway or a trail or the like.

The amphibious motorcycle 11 of the present invention also includes means for operating the vehicle 11 upon the surface of a body of water as the vehicle is propelled. More specifically, the vehicle 11 includes a pair of forward skis 23, 25 which are attached to the fork 15 for supporting the forward portion, as at 27, of the vehicle 11 upon the surface S of a body of water as the vehicle 11 is propelled. The vehicle 11 also includes a pair of rearward skis 29, 31 which are attached to the frame 13 adjacent the rearward wheel 19 for supporting the rearward portion, as at 33, of the vehicle 11 upon the surface S of the body of water as the vehicle 11 is propelled. Further, the vehicle 11 includes propelling means, as at 35, which are coupled to the drive means 31 for propelling the vehicle 11 over the surface S of the water.

The forward skis 23, 25 are fixedly attached to the fork 15 in a manner obvious to those skilled in the art, e.g., by the braces 37 depicted in FIG. 1 of the drawing. Since the braces 37 form no part of the present invention it is believed unnecessary to elaborate further thereon. Likewise, the rearward skis 29, 31 are fixedly attached to the frame 13 in somewhat the same manner as are the skis 29, 31, e.g., by the use of rearward braces 39 or the like.

The motorcycle 11 also includes guide means, as at 41, which are coupled to the fork 15 for manually controlling the direction in which the vehicle 11 travels as it is propelled over the surface S of the water. The guide means 41 preferably includes a disk 43 which is fixedly mounted in place along the vertical center line of the forward wheel 17 whereby pivoting the fork 15 about the substantially vertical axis is effective to control the direction in which the vehicle 11 travels as it is propelled over the surface S of the water. More specifically, the wheel 17, having the usual hub 45 supported by a plurality of spokes 47, includes a pneumatic tire 49 as clearly shown in FIG. 2 of the drawing. The disk 43 is disposed in such a manner that the tire 49 is circumferentially positioned thereabout, thus even though the wheel 17 is rotating when the vehicle 11 encounters the water, the guide means 41 remains ever effective.

Figure 2:
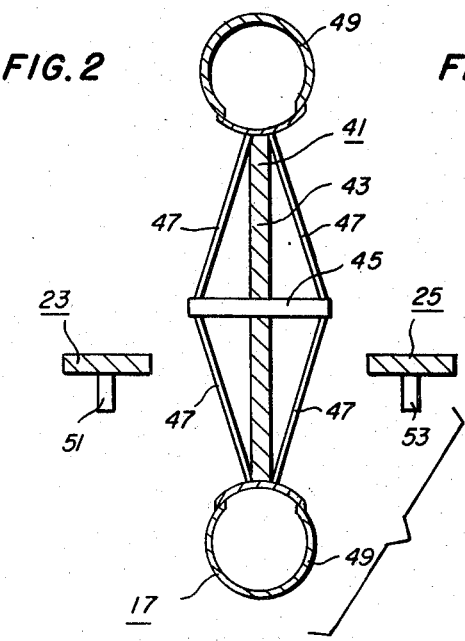
FIG. 2 is a sectional view taken as on the line II—II of FIG. 1.

The guide means 41 additionally includes a pair of forward skegs 51, 53 which are fixedly attached respectively in any well-known manner, as by adhesive or the like, to the forward skis 23, 25 as clearly shown in FIGS. 1 and 2 of the drawing. More specifically, the skegs 51, 53 are disposed subjacent the respective skis 23, 25 so that they are submerged a predetermined distance into the water to enhance the control effect achieved by the above-described disk 43. The skegs 51, 53 preferably are wedge shaped in profile as clearly shown in FIG. 1 of the drawing, and preferably extend from a point substantially midway of the skis 23, 25 rearwardly with the apex of the skegs, as at 55 being adjacent the hub 45 and being directed forwardly with respect to the direction of travel of the vehicle 11, as indicated by the arrow 57.

The vehicle 11 preferably includes stabilization means, as at 59, which are attached to the rearward skis 29, 31 for stabilizing the vehicle 11 in the various directions in which it travels. More specifically, the stabilization means 59 preferably includes a pair of rearward skegs 61, 63 fixedly attached respectively to the rearward skis 29, 31 in substantially the same manner as above described for the forward skegs 51, 53. It will be appreciated that the waterborne amphibious vehicle 11 is intended to be moving over the surface S rather rapidly. Accordingly, the rearward skegs 61, 63 provide stability and maneuverability to the amphibious vehicle 11, i.e., the rearward portion 33 is prevented from skewing sidewards by the skegs 61, 63. The rearward skegs 61, 63 preferably extend substantially along the entire length of the skis 29, 31 and are preferably of a uniform height throughout the length thereof.

Figure 3:
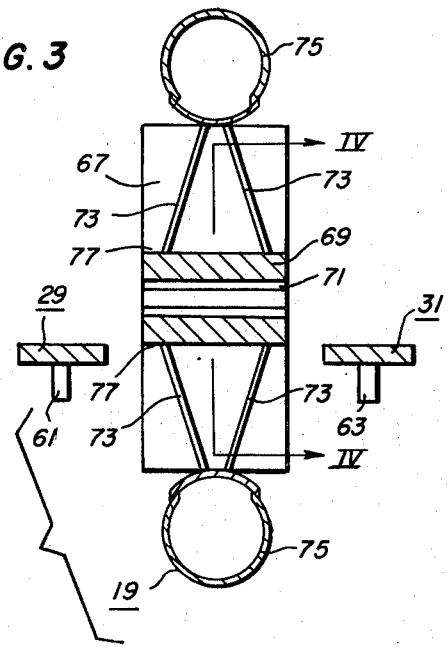
FIG. 3 is a sectional view taken as on the line III—III of FIG. 1.
Figure 4:
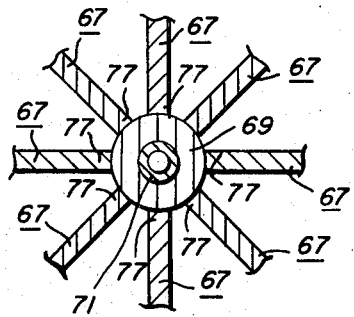
FIG. 4 is a sectional view taken as on the line IV—IV of FIG. 3.

From FIGS. 3 and 4 of the drawing it may be seen that the propelling means 35 preferably includes a plurality of paddle like members 67 which are symmetrically arranged radially about the rearward wheel 19 and are fixedly attached thereto for rotation therewith. It will be understood that the rearward wheel 19 is coupled to the drive means 21 and is rotatably driven thereby in the usual fashion. The propelling means 35 also includes a sleeve member 69 which facilitates adapting the paddle like members 67 to the wheel 19. It should be understood that the rear wheel 19 includes the usual hub 71, spokes 73 and a pneumatic tire 75. The sleeve member 69 is adapted to fixedly engage the hub 71 in any well-known manner, e.g., welding or the like. The paddle like members 67, being rectangular in shape, are disposed between the spokes 73 and the inwardly directed ends, as at 77, are fixedly attached to the sleeve member 69 in any well-known manner, e.g., as by welding or the like. The width of the paddle like members 67 preferably is as wide as the frame structure 13 adjacent the rearward wheel 19 will permit. In this regard, it may be desirable that the frame structure 13 be modified to accommodate wider paddle like members 67 than would the conventional frame 13. Additionally, even though only one embodiment of the propelling means 35 is herein disclosed the vehicle 11 may be modified in a manner obvious to those skilled in the art to incorporate other well-known propelling means if desirable.

It will be appreciated by those skilled in the art that the construction characteristics of the skis 23, 25, 29, 31, except as above disclosed, form no part of the present invention and it is therefore believed unnecessary to elaborate further thereon than as follows: The construction features of the skis 23, 25, 29, 31 may be in accordance with any well-known ski structure and it is the applicant's intention that the skis 23, 25, 29, 31 have various different well-known features for various purposes, e.g., racing skis, and jumping skis, etc. without departing from the spirit and scope of the present invention.

Although the invention has been described and illustrated with respect to a preferred embodiment thereof, it is to be understood that it is not to be so limited since changes and modifications may be made therein which are within the full intended scope of the invention.

I claim:

1. The combination with a motorized non-buoyant vehicle having a frame, a guidable fork pivotally attached to said frame for pivotal movement about a substantially vertical axis, a forward wheel rotatably attached to said fork, a rearward wheel journaled to said frame, and drive means attached to said frame for rotatably driving at least one of said forward and rearward wheels; forward strip-like ski means attached to said fork for supporting the forward portion of the vehicle upon the surface of a body of water as the vehicle is propelled, rearward strip-like ski means attached to said frame adjacent said rearward wheel for supporting the rearward portion of the vehicle upon the surface of the water as the vehicle is propelled, and propelling means coupled to said drive means for propelling the vehicle over the surface of the water, said forward and rearward ski means constituting the sole supporting means for said vehicle only while under power in water.

2. The combination of claim 1 in which is included guide means coupled to said fork for manually controlling the direction in which the vehicle travels as it is propelled over the surface of the water.

3. The combination of claim 2 in which said guide means includes disc means fixedly mounted in place along the vertical center line of said forward wheel whereby pivoting said fork about said substantially vertical axis being effective to control the direction in which the vehicle travels as it is propelled over the surface of the water.

4. The combination of claim 3 in which said guide means additionally includes forward skeg means fixedly attached to said forward ski means subjacent thereof for submerging a predetermined distance into the water to enhance the control effect achieved by said disc means.

5. The combination of claim 2 in which is included stabilization means attached to said rearward ski means for stabilizing the vehicle in the various directions in which it travels.

6. The combination of claim 5 in which said stabilization means includes rearward skeg means fixedly attached to said rearward ski means subjacent thereof for submerging a predetermined distance into the water for providing stability and maneuverability to the vehicle.

7. The combination of claim 1 in which said propelling means includes a plurality of paddle like members symmetrically arranged radially about said rearward wheel and fixedly attached thereto for rotation therewith, said rearward wheel being coupled to said drive means and being rotatably driven thereby.

8. The combination with a conventional motorized non-buoyant vehicle having a frame, a guidable fork pivotally attached to said frame for pivotal movement about a substantially vertical axis, a forward wheel rotatably attached to said fork, a rearward wheel journalled to said frame, and drive means attached to said frame for rotatably driving said rearward wheel; a pair of forward strip-like skis attached to said fork for supporting the forward portion of the vehicle upon the surface of a body of water as the vehicle is propelled, a pair of rearward strip-like skis attached to said frame adjacent said rearward wheel for supporting the rearward portion of the vehicle upon the surface of said body of water as the vehicle is propelled, a pair of forward skeg means fixedly attached respectively to said pair of forward skis subjacent thereof for providing directional guidance of the vehicle, a pair of rearward skeg means fixedly attached respectively to said pair of rearward skis subjacent thereof for providing stability and maneuverability to the vehicle, and propelling means coupled to said drive means for propelling the vehicle over the surface of the water said forward and rearward ski means constituting the sole supporting means for said vehicle only while under power in water.

* * * * *